United States Patent
Futatsugi et al.

(10) Patent No.: US 11,728,701 B2
(45) Date of Patent: Aug. 15, 2023

(54) CANNED MOTOR AND CANNED MOTOR MANUFACTURING METHOD

(71) Applicant: NIKKISO CO., LTD., Tokyo (JP)

(72) Inventors: Kazuo Futatsugi, Higashimurayama (JP); Osamu Watanabe, Higashimurayama (JP); Yasushi Kubota, Higashimurayama (JP); Yu Kodama, Higashimurayama (JP); Masaaki Eguchi, Higashimurayama (JP)

(73) Assignee: NIKKISO CO., LTD., Tokyo (JP)

( * ) Notice: Subject to any disclaimer, the term of this patent is extended or adjusted under 35 U.S.C. 154(b) by 240 days.

(21) Appl. No.: 17/263,732

(22) PCT Filed: Jul. 18, 2019

(86) PCT No.: PCT/JP2019/028304
§ 371 (c)(1),
(2) Date: Jan. 27, 2021

(87) PCT Pub. No.: WO2020/031651
PCT Pub. Date: Feb. 13, 2020

(65) Prior Publication Data
US 2021/0376675 A1   Dec. 2, 2021

(30) Foreign Application Priority Data
Aug. 9, 2018  (JP) .................................. 2018-150706

(51) Int. Cl.
*H02K 1/28*   (2006.01)
*H02K 15/00*  (2006.01)
*H02K 17/16*  (2006.01)

(52) U.S. Cl.
CPC .......... *H02K 1/28* (2013.01); *H02K 15/0012* (2013.01); *H02K 17/165* (2013.01)

(58) Field of Classification Search
CPC .... H02K 1/28; H02K 15/0012; H02K 17/165; H02K 7/04; H02K 17/16; H02K 2213/03;
(Continued)

(56) References Cited

U.S. PATENT DOCUMENTS 6,437,474 B1 *  8/2002  Chu ..................... H02K 1/2773
                                                29/598
7,239,056 B1 *  7/2007  Griggs ................. H02K 5/1732
                                                310/90
(Continued)

FOREIGN PATENT DOCUMENTS

CN   207098799 U  *  3/2018
CN   207098799 U     3/2018
(Continued)

OTHER PUBLICATIONS

Aug. 23, 2022, Office Action issued in Japanese Patent Application No. 2018-150706.
(Continued)

*Primary Examiner* — Thomas Truong
(74) *Attorney, Agent, or Firm* — Oliff PLC (57) ABSTRACT

This canned motor (10) is provided with a rotor (14); a cylindrical rotor can (42) that houses the rotor (14); an end plate (40) that covers an opening of the rotor can (42) in the axial direction and is joined to the rotor can (42); a rotating shaft (16) that passes through the rotor (14) and the end plate (40); and an annular wall (46) that surrounds the outer circumference of the rotating shaft (16), is joined to or integrated with the end plate (40), and is joined to the entire circumference of the rotating shaft (16) at an end thereof in the axial direction. The thickness of the end plate (40) is larger than the thickness of the annular wall (46).

4 Claims, 7 Drawing Sheets

(58) Field of Classification Search
CPC .......... H02K 7/14; H02K 5/128; H02K 15/02; H02K 1/22; H02K 7/003; H02K 15/16
See application file for complete search history.

(56) References Cited

U.S. PATENT DOCUMENTS

| | | |
|---|---|---|
| 9,979,245 B2 | 5/2018 | Maeda |
| 2003/0160525 A1 | 8/2003 | Kimberlin et al. |
| 2011/0187219 A1 | 8/2011 | Okitsu et al. |
| 2012/0248920 A1 | 10/2012 | Takahashi et al. |
| 2014/0147306 A1 | 5/2014 | Yamashita et al. |
| 2014/0241914 A1 | 8/2014 | Ojima et al. |
| 2017/0358963 A1 | 12/2017 | Lim et al. |

FOREIGN PATENT DOCUMENTS

| | | |
|---|---|---|
| DE | 20 2009 013 649 U1 | 12/2009 |
| EP | 2719875 A1 | 4/2014 |
| JP | S55-69855 U | 5/1980 |
| JP | S58-108750 U | 7/1983 |
| JP | H06-26491 A | 2/1994 |
| JP | 2001-119888 A | 4/2001 |
| JP | 2001-129677 A | 5/2001 |
| JP | 2004-104917 A | 4/2004 |
| JP | 2010-011681 A | 1/2010 |
| JP | 2012-217287 A | 11/2012 |
| JP | 2017-192169 A | 10/2017 |
| TW | 201434238 A | 9/2014 |
| TW | I643428 B | 12/2018 |

OTHER PUBLICATIONS

Sep. 15, 2021 Search Report issued in European Patent Application No. 19846396.0.
Feb. 8, 2022 Office Action issued in Japanese Patent Application No. 2018-150706.
Feb. 20, 2021 Office Action issued in Taiwanese Patent Application No. 108126331.
Feb. 9, 2021 International Preliminary Report on Patentability issued in International Patent Application No. PCT/JP2019/028304.
Jun. 13, 2023 Office Action issued in European Patent Application No. 19846396.0.

* cited by examiner

CANNED MOTOR AND CANNED MOTOR MANUFACTURING METHOD

TECHNICAL FIELD

The present specification discloses a canned motor including a rotor and a stator enclosed within a sealed can, and a manufacturing method of a canned motor.

BACKGROUND

Canned motors including a rotor and a stator enclosed within a sealed can are known. A canned motor may be incorporated in an apparatus that uses fluid, such as a pump and an agitator. The rotor in a canned motor includes a rotor core typically housed in a cylindrical rotor can. The rotor can has openings at respective axial ends of the rotor can, and each opening is closed with a corresponding one of end plates disposed at axial end faces of the rotor core. A rotating shaft passes through the center of the rotor core and the end plates. The outer surface of the rotating shaft and the inner circumferential edge of the end plates are joined together by welding.

Typically, operation of the canned motor may apply to the rotating shaft a counter force from a load or a force generated by unbalanced rotation. This may in turn lead to concentration of stress to a portion where the rotating shaft and the end plate are welded together, causing cracking in that welded portion. To avoid such cracking in the welded portion, an approach of joining the end plate and the rotating shaft by filled welding to increase the leg length has been employed. This approach increases the strength of the welded portion to thereby avoid generation of cracks. However, the increased welding leg length may correspondingly increase the amount of heat input to the rotating shaft during the manufacturing process, which may cause the rotating shaft to be bent during the manufacturing process. A rotating shaft thus bent must be corrected using a hammering process or a re-heating process, which complicates the manufacturing process.

CITATION LIST

Patent Literature

PATENT DOCUMENT 1: JP 2001-119888 A
PATENT DOCUMENT 2: JP S55-69855 A
PATENT DOCUMENT 3: JP S58-108750 U

SUMMARY

Technical Problem

Patent Documents 1 to 3 suggest use of an elastically deformable thin end plate. A thin end plate elastically deforms to relieve the stress against a counter force and other forces acting on the rotating shaft, and therefore prevents cracking and the like without increasing the leg length of a welded portion. A thin end plate, however, is also likely to undergo plastic deformation or breakage under external pressure. Further, a portion of an end plate is typically removed by drilling, for example, for regulating rotation balance of the rotor; however, a thin end plate has no region to be removed. As such, a member that regulates rotation balance of the rotor, such as a balance ring, should be employed in addition to the end plate, resulting in increased costs and a complicated manufacturing process.

As such, canned motors which can be easily manufactured easily and with reduced plastic deformation or breakage of an end cover have not existed. The present specification therefore discloses a canned motor that can be manufactured easily with reduced plastic deformation or breakage of an end cover, and a method of manufacturing such a canned motor.

Solution to Problem

A canned motor disclosed in the present specification includes a rotor, a rotor can having a cylindrical shape and housing the rotor, an end plate joined to the rotor can and covering an axial opening of the rotor can, a rotating shaft extending through the rotor and the end plate, and an annular wall surrounding an outer circumference of the rotating shaft, joined to or integral with the end plate, and having an axial front end joined to an entire circumference of the rotating shaft. The end plate has a thickness that is greater than the thickness of the annular wall.

This configuration enables elastic deformation of the annular wall to thereby relieve the stress against a counter force applied to the rotating shaft, for example. This configuration results in fewer cracks or the like in a welded portion even with a smaller leg length of the welded portion of the annular wall and rotating shaft. This realizes a reduction in the amount of heat input to the rotating shaft during the manufacturing process, thereby reducing the amount of thermal bending of the rotating shaft. This further eliminates any need to correct a bent rotating shaft and therefore simplifies the manufacturing process. Meanwhile, the end plate has a sufficiently large thickness to reduce plastic deformation or breakage, and a portion of the end plate may be removed for balance regulation.

With this configuration, the annular wall may be separate from the end plate and may be part of a joining ring partially joined to the end plate. The joining ring may include at least a base portion superposed on an axially outward end face of the end plate and the annular wall extending axially from an inner circumferential edge of the based portion.

The configuration including the annular wall that is part of the joining ring separate from the end plate provides an increased creeping distance between the joining portion where the joining ring and the rotating shaft are joined together and the joining portion where the joining ring and the end plate are joined together. This in turn yet more reliably relieves stress by facilitating elastic deformation of the joining ring including the annular wall.

In the above configuration, the joining ring may have a substantially C-shape cross section including the base portion, the annular wall, and an outer circumferential wall extending axially outward from an outer circumferential edge of the base portion. The end plate may include, at the axially outward end face, a recess portion such that the end plate has a smaller thickness in a region corresponding to a width of the base portion from the inner circumferential edge of the end plate. The joining ring may be disposed in the recess portion and joined to the end plate at the axial front end of the outer circumferential wall.

This configuration sufficiently increases the creeping distance from the joining portion of the joining ring and the rotating shaft to the joining portion of the joining ring and the end plate. This yet more reliably relieves stress by further facilitating elastic deformation of the joining ring including the annular wall.

The end plate may have an annular channel that is concentric with the rotating shaft on an axially outward end face of the end plate, and the annular channel may have an inner circumferential wall that functions as the annular wall.

This configuration does not include a joining ring that is separate from the end plate, and therefore does not increase the number of components to simplify the manufacturing process, and prevents plastic deformation or breakage of the end plate.

A method for manufacturing a canned motor disclosed in the specification includes disposing an annular wall joined to or integral with an end plate disposed on an axial end face of a rotor, along an outer circumference of a rotating shaft extending through a rotor core and the end plate; and welding an axial front end of the annular wall to an entire circumference of the rotating shaft.

This configuration enables elastic deformation of the annular wall to thereby relieve the stress from a counter force applied to the rotating shaft, for example. This configuration results in fewer cracks or the like in a welded portion even with a smaller leg length of the welded portion of the annular wall and rotating shaft. This results in a reduction in the amount of heat input to the rotating shaft during the manufacturing process, thereby reducing bending of the rotating shaft caused by the heat. This further eliminates need to correct a bent rotating shaft, and therefore simplifies the manufacturing process. Meanwhile, the end plate has a sufficiently large thickness and prevents plastic deformation or breakage of the end plate, and a portion of the end plate may be removed for balance regulation.

A portion of the end plate may be removed to regulate rotation balance of the rotor core.

Because configuration does not employ a separate member, such as a balance ring, for rotation balance regulation, increased costs are avoided.

Advantageous Effects

The canned motor and the method for manufacturing the canned motor disclosed in the specification facilitate manufacturing of a canned motor with reduced plastic deformation or breakage of an end cover.

DESCRIPTION OF EMBODIMENTS

Figure 1:
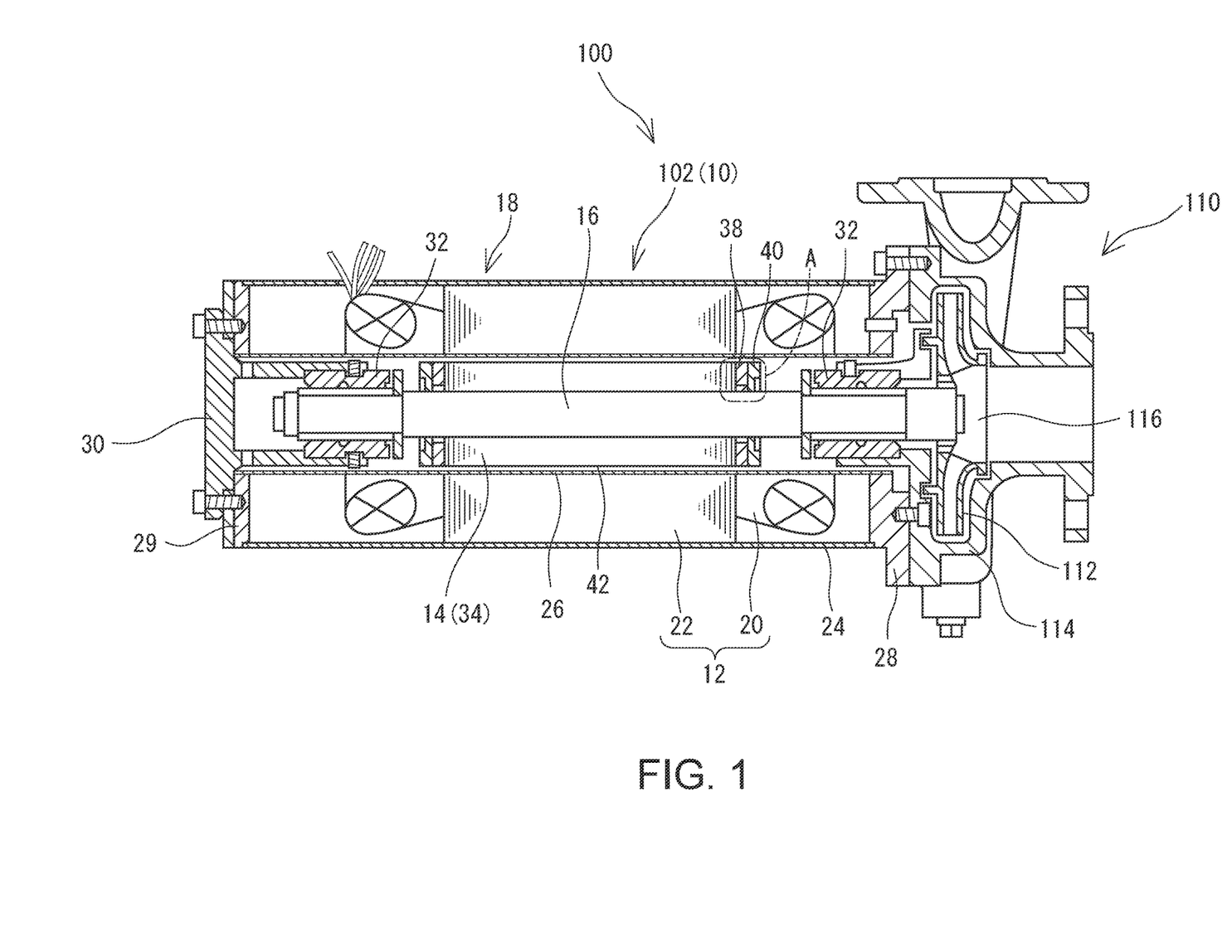
FIG. 1 is a cross sectional view illustrating a configuration of a canned motor pump in which a canned motor is incorporated.
Figure 2:
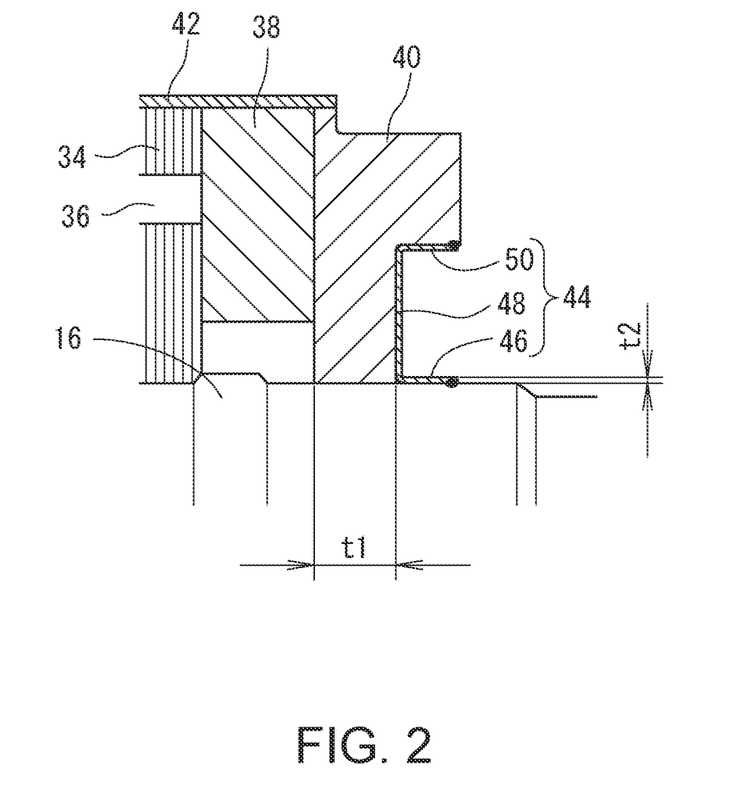
FIG. 2 is an enlarged view of portion A.
Figure 3:
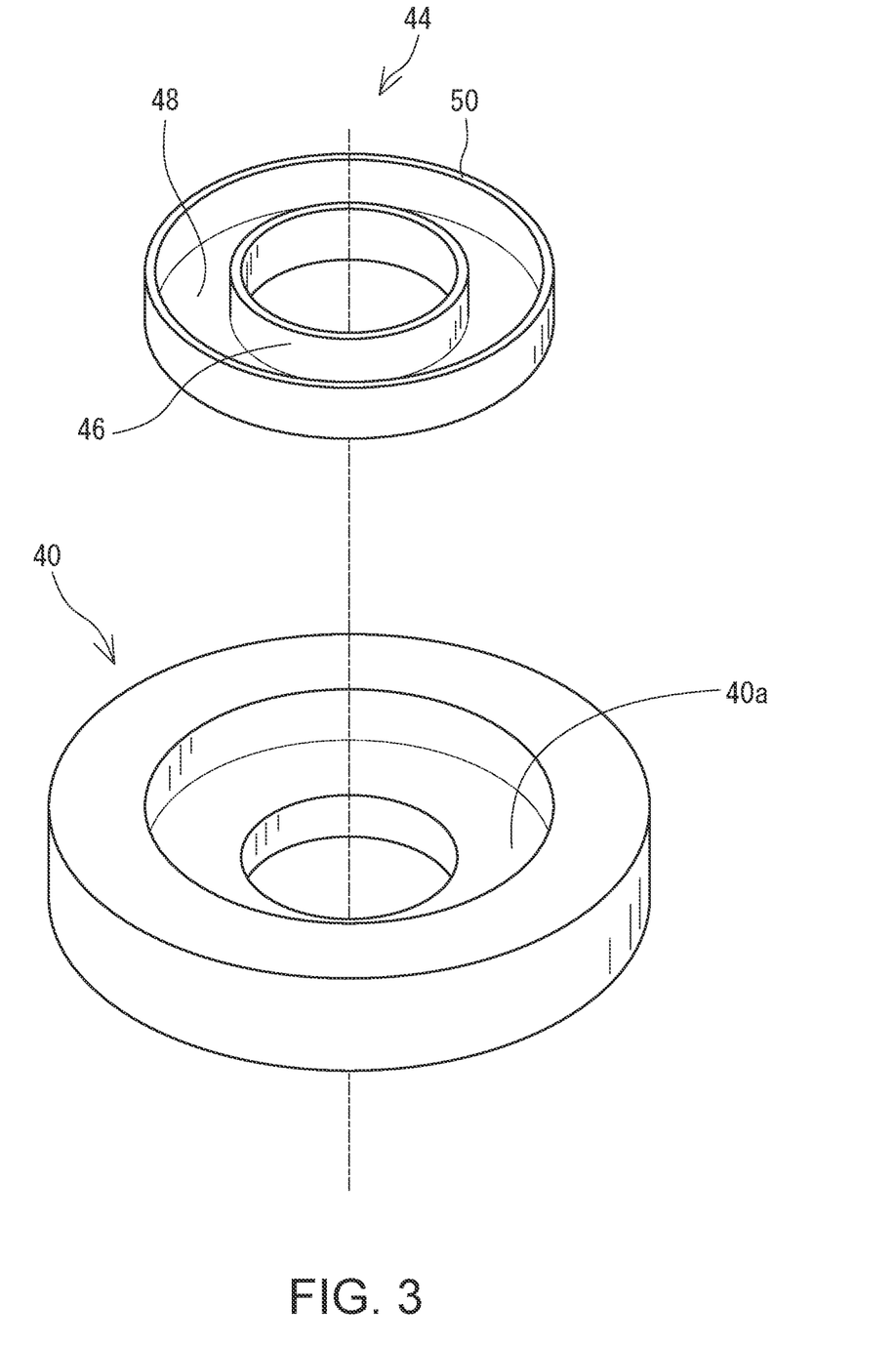
FIG. 3 is an exploded perspective view of an end plate and a joining ring.

The configuration of a canned motor 10 will be described by reference to the drawings. FIG. 1 is a cross sectional view illustrating the configuration of a canned motor pump 100 in which a canned motor 10 is incorporated. FIG. 2 is an enlarged view of FIG. 1, and FIG. 3 is an exploded perspective view of an end plate 40 and a joining ring 44. In the following description, unless otherwise specified, the "axial direction" or "axially", the "radial direction" or "radially", the "circumferential direction" or "circumferentially" refer to the axial direction, radial direction, circumferential direction of a rotor 14, respectively.

The canned motor pump 100 includes a pump section 110 having a configuration of a centrifugal pump, and a motor section 102 for driving the centrifugal pump. The pump section 110 includes an impeller 112 and a casing 114 that forms a pump chamber 116 housing the impeller 112. The impeller 112 is coupled with an end of a rotating shaft 16 of the motor, which will be described below.

The motor section 102 includes the canned motor 10 and a motor housing 18 that houses the canned motor 10. The canned motor 10 includes the rotor 14 that rotates with the rotating shaft 16, and a stator 12 surrounding the rotor 14.

The stator 12 includes a stator core 20 having a substantially cylindrical shape and a coil 22 formed of a winding wound around teeth of the stator core 20. An end of a conductive line of the coil 22 is extended to the outside of the motor housing 18 and electrically connected with a power source (not shown).

A cylindrical stator can 26 is disposed inside the stator core 20 and outside the rotor 14. In other words, the stator can 26 is located between the rotor 14 and the stator 12. The stator can 26 is in contact with the inner surface of the stator core 20, that is, tip end faces of the teeth, while the stator can 26 is disposed at a fixed interval from the outer surface of the rotor 14.

A cylindrical stator band 24 is disposed outside the stator core 20. The stator can 26 and the stator band 24 are concentrically disposed and have substantially the same length along the axial direction X. End bells 28 and 29 having an annular plate shape are disposed at opposite ends of the stator can 26 and the stator band 24 to close the ends of a cylindrical space between the stator can 26 and the stator band 24.

The end bell 28 disposed adjacent to the pump section 110 is coupled with the casing 114 via bolts. A disk end board 30 is coupled, via bolts, to the end bell 29 disposed further from the pump section 110, to close an end of the space inside the stator can 26. The stator band 24, the two end bells 28 and 29, and the disk end board 30 form the motor housing 18 that houses the motor. The stator 12 is housed within a space enclosed or formed by the stator band 24, the two end bells 28 and 29, and the stator can 26.

The rotating shaft 16 integral with the rotor 14 is supported at its opposite ends by respective bearings 32. The rotating shaft 16 is formed from a nonmagnetic material, such as stainless steel.

The rotor 14 includes a cylindrical rotor core 34, a plurality of secondary conductors 36 (not shown in FIG. 1) embedded in the rotor core 34, and short-circuit rings 38 that short-circuit the plurality of secondary conductors 36. The rotor core 34 may be composed of stacked electromagnetic steel sheets, for example. The rotor core 34 has an axis hole formed axially through the center of the rotor core 34. The rotating shaft 16 passes through the axis hole and is fixed therein, such that the rotating shaft 16 rotatable with the rotor core 34.

The plurality of secondary conductors 36 are inserted in the rotor core 34 at intervals along the circumferential direction. The secondary conductors 36 are formed from copper or aluminum, for example, and axially penetrate through the rotor core 34. The short-circuit ring 38 is a substantially annular member formed from the same material as that of the secondary conductor 36. The short-circuit rings 38 are disposed at respective axial opposite ends of the rotor core 34, to connect the plurality of secondary conductors 36 for short-circuiting. While in this example the canned motor 10 is described as a squirrel-cage three-phase induction motor, the canned motor 10 may be another type of electric machine, such as a permanent magnet electric machine. A permanent magnet electric machine may omit the short-circuit ring 38, and a permanent magnet serving as a magnetic pole is embedded in the rotor core 34, in place of the secondary conductors 36.

The rotor 14 is housed in the cylindrical rotor can 42 that is composed of a thin plate formed from a non-magnetic material, such as stainless steel. The rotor can 42 has openings at its axial ends, which are closed by the end plates 40.

The end plate 40 is a plate member disposed at each axial end of the rotor 14 and is formed from a non-magnetic material such as stainless steel. The end plate 40 has a disk shape with an axis hole in its center, through which the rotating shaft 16 can pass. The end plate 40 has a thickness that is sufficient to prevent plastic deformation under an external force, as will be described below.

A portion of the end plate 40 is removed for balance regulation during the motor manufacturing process. Specifically, the end plate 40 includes, at its side face or an end face, a drilled hole (not shown) for balance regulation.

The rotor can 42 is joined to the outer surface of the end plate 40 by welding. The end plate 40 includes a recess portion 40a at its axially outer end face, to have a smaller thickness only in a predetermined range from the inner circumferential edge. As illustrated in FIG. 2, a substantially rectangular recess that is opened axially outward is formed between the recess portion 40a and the outer surface of the rotating shaft 16. A joining ring 44 is disposed within the recess (recess portion 40a).

As illustrated in FIGS. 2 and 3, the joining ring 44 is a ring member having a center through which the rotating shaft 16 is insertable. The joining ring 44 is formed from a non-magnetic material such as stainless steel, for example, which is the same type of material as the rotating shaft 16 and the end plate 40. The joining ring 44 has a substantially C-shape cross section including a base portion 48 superposed on the axially outer end face of the end plate 40, an annular wall 46 extending axially outward from the inner circumferential edge of the base portion 48, and an outer circumferential wall 50 extending axially outward from the outer circumferential edge of the base portion 48. The base portion 48 has substantially the same width as the recess portion 40a, such that when the joining ring 44 is placed within the recess portion 40a, the outer circumferential wall 50 is proximate to the outer surface of recess portion 40a and the annular wall 46 is similarly proximate to the outer surface of the rotating shaft 16 so as to surround the outer circumference of the rotating shaft 16.

The joining ring 44 is joined to the rotating shaft 16 and the end plate 40 by welding. Specifically, an axial front end of the annular wall 46 and the rotating shaft 16 are welded over the entire circumference and an axial front end of the outer circumferential wall 50 and the end plate 40 are welded over the entire circumference. FIG. 2 indicates the welding portions with black ellipses. This welding couples the end plate 40 with the rotating shaft 16 via the joining ring 44. The annular wall 46 and the outer circumferential wall 50 joined to the rotating shaft 16 and the end plate 40 by welding over the entire circumferences prevents entering of liquid into the rotor can 42.

As clearly shown in FIG. 2, the joining ring 44 is joined such that only the front ends of the annular wall 46 and the outer circumferential wall 50 are welded, while the remaining portions of the joining ring 44 are in a free state and not welded neither to the rotating shaft 16 or the end plate 40. This configuration will be described by comparison to known art.

Figure 9:
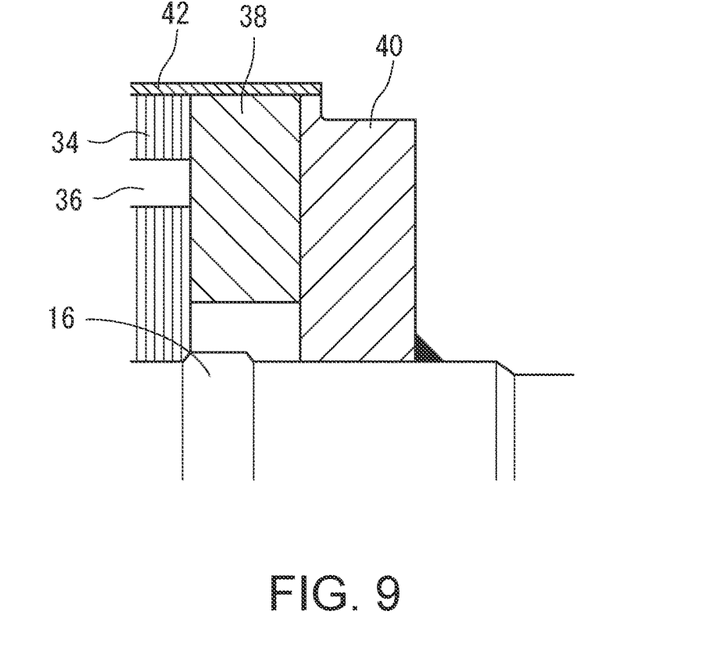
FIG. 9 is an enlarged view of a portion around an end plate in a conventional canned motor.

FIG. 9 is a diagram illustrating the configuration around the end plate 40 of the known art. As illustrated in FIG. 9, the inner circumferential edge of the end plate 40 is directly joined to the rotating shaft 16 by welding, not via the joining ring 44. This configuration complicates the manufacturing process. Specifically, the canned motor 10, when operated, typically applies a counter force from a load or a force generated by unbalanced rotation to the rotating shaft 16. Such a force causes concentration of stress at a portion where the rotating shaft 16 and the end plate are welded together, thus causing cracks in that welded portion. In the known art, the end plate 40 and the rotating shaft 16 are fillet-welded to increase the leg length of the welded portion to prevent resulting cracks from forming in the welded portion. The black shaded region in FIG. 9 indicates a location where fillet welding is performed. The increased leg length of the welded portion increases the strength of the welded portion and thereby prevents cracking. However, increasing the leg length leads to a corresponding increase in the amount of heat input to the rotating shaft 16 during the manufacturing process, which may in turn cause the rotating shaft 16 to be bent during the manufacturing process. A bent rotating shaft 16 must then be corrected using a hammering process or a re-heating process, complicating the manufacturing process.

Figure 10:
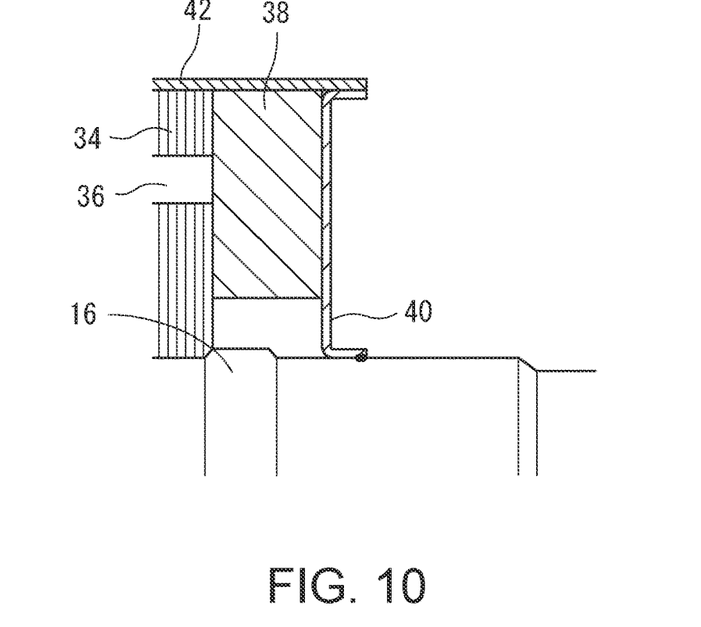
FIG. 10 is an enlarged view of a portion around an end plate in a conventional canned motor.

To avoid the above issue, an approach of thinning the end plate 40 as illustrated in FIG. 10 is proposed. The thin end plate 40 elastically deforms to relieve the stress against a counter force or an unbalanced rotating force acting on the rotating shaft 16, and therefore prevents cracking and the like without increasing the leg length of a welded portion. This results in a reduction in the amount of heat input to the rotating shaft 16 during the manufacturing process, efficiently avoiding bending of the rotating shaft 16 caused by the heat.

However, the thin end plate 40 itself is likely to undergo plastic deformation or breakage under external force. When the pump line pressure (suction pressure) of the canned motor pump 100 rises to a high pressure, the entire end plate 40 may deform significantly to plastically deform or break. In particular, as the inner diameter of the short-circuit ring 38 is sufficiently greater than the outer diameter of the rotating shaft 16 and nothing supports the thin end plate 40 along the thickness direction in a region between the inner circumferential edge of the short-circuit ring 38 and the rotating shaft 16, the thin end plate 40 deforms easily.

To balance the rotor 14, a portion of the end plate 40 is usually removed by, for example, drilling. However, as the thin end plate 40 has no region to be removed for balancing, the configuration including the thin end plate 40 need to employ a separate ring for balancing, for example, resulting in increased costs and complicated manufacturing process.

The canned motor 10 disclosed in the specification includes the end plate 40 having a sufficient thickness that is coupled, via the thin joining ring 44, to the rotating shaft 16, as described above. The joining ring 44 is welded to the rotating shaft 16 and the end plate 40 only at the front end of the annular wall 46 and at the front end of the outer circumferential wall 50 to allow the remaining portions of the joining ring 44 other than the welded portions to elastically deform comparatively easily. This enables the joining ring 44 to deform and relieve the stress caused by a counter force and an unbalanced force applied to the rotating shaft 16 in conjunction with operation of the canned motor 10. This configuration eliminates the use of an increased leg length of the welded portion between the annular wall 46 and the rotating shaft 16. In this example, melt run welding is used to join the annular wall 46 and the rotating shaft 16 and join the outer circumferential wall 50 and the end plate 40 to reduce the amount of input heat. This effectively prevents bending of the rotating shaft 16 caused by heat and omits the process of correcting the bending of the rotating shaft 16, thereby simplifying the manufacturing process of the canned motor 10. While in this example melt run welding is used, any other welding method in which the amount of heat input to the rotating shaft 16 is reduced (the leg length is reduced), such as fillet welding, may also be employed.

The joining ring 44 which is supported by the thick end plate 40 is unlikely to break or plastically deform under external force. Further, a portion of the end plate 40 having a large thickness can be removed for balancing.

The joining ring 44, particularly the annular wall 46, may have any thickness that allows easy elastic deformation against various forces received from the rotating shaft 16 in association with the operation of the canned motor 10. Further, the end plate 40 may also have any thickness that prevents its deformation under the external force. In some embodiments, the thickness t1 of the inner circumferential edge of the end plate 40 is greater than at least the thickness t2 of the annular wall 46. The thickness t1 is preferably at least twice as great as the thickness t2, more preferably at least five times as great as the thickness t2, and further preferably at least ten times as great as the thickness t2.

The configuration described above is one example. Any configurations including the annular wall 46 surrounding the outer surface of the rotating shaft 16 and joined or integral with the end plate 40, with its axial front end joined to the entire circumference of the rotating shaft 16, may be otherwise modified as appropriate.

Figure 4:
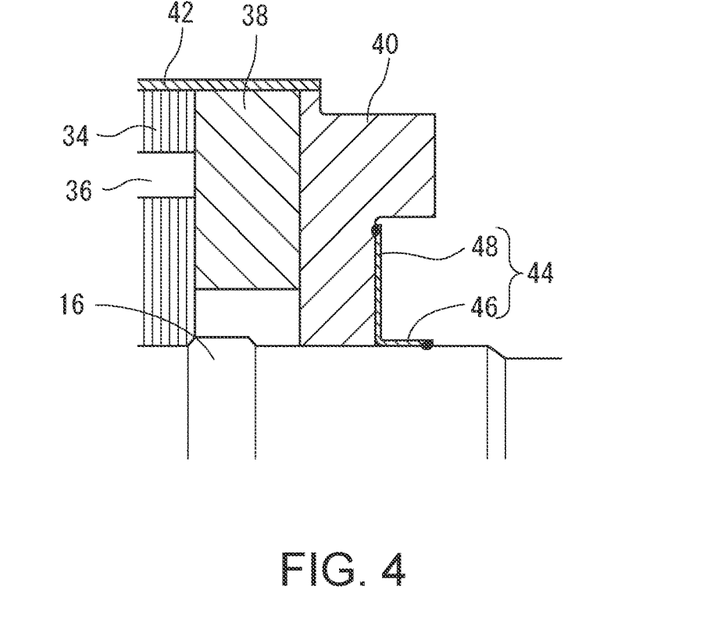
FIG. 4 is a diagram illustrating another example annular ring.

For example, the joining ring 44 may have an L-shape cross section including only the annular wall 46 and the base portion 48, as illustrated in FIG. 4. In this configuration, the entire outer circumferential edge of the base portion 48 is co-welded with the end plate 40. Here, the joining ring 44 is more likely to elastically deform and relieve the stress as the creeping distance between the welded portion of the rotating shaft 16 and the welded portion of the end plate 40 is greater. Therefore, it is desirable that the joining ring 44 having an L-shape cross section should include the base portion 48 or the annular wall having a length that is increased by the length of the outer circumferential wall 50, to thereby establish a sufficient creeping distance.

Figure 5:
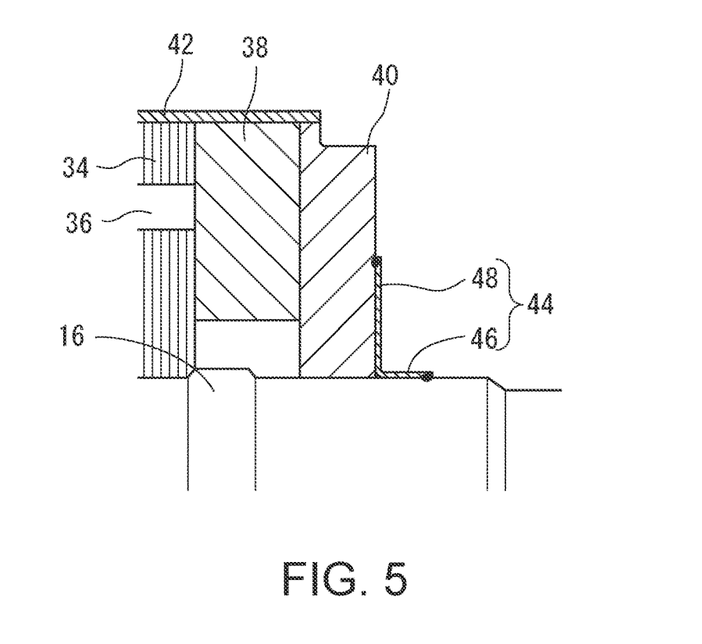
FIG. 5 is a diagram illustrating another example annular ring.

While in the examples described above, the end plate 40 includes the recess portion 40a where the joining ring 44 is disposed in a region proximate to the inner circumference of the end plate 40, the end plate 40 may include no recess portion 40a, as illustrated in FIG. 5. In other words, the end plate 40 may have an axially outward end face that is flat and even. The configuration having no recess portion 40a but including the thin joining ring 44 coupling the end plate 40 and the rotating shaft 16 may similarly relieve a force caused by the operation of the canned motor 10, due to elastic deformation of the joining ring 44. This configuration allows the joining ring 44 to join the rotating shaft 16 and the end plate 40 with melt run welding with a small amount of input heat, thereby reducing bending of the rotating shaft 16 caused by the heat to simplify the manufacturing process of the canned motor 10. Meanwhile, the end plate itself having a sufficiently large thickness efficiently prevents damage or plastic deformation of the joining ring, and part of the end plate may be removed to regulate the rotation balance.

Figure 6:
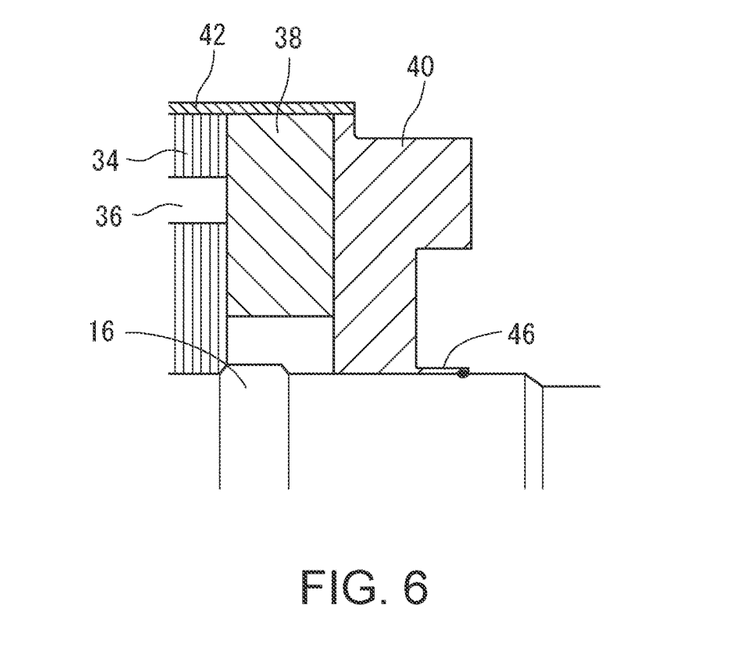
FIG. 6 is a diagram illustrating another example annular ring.
Figure 7:
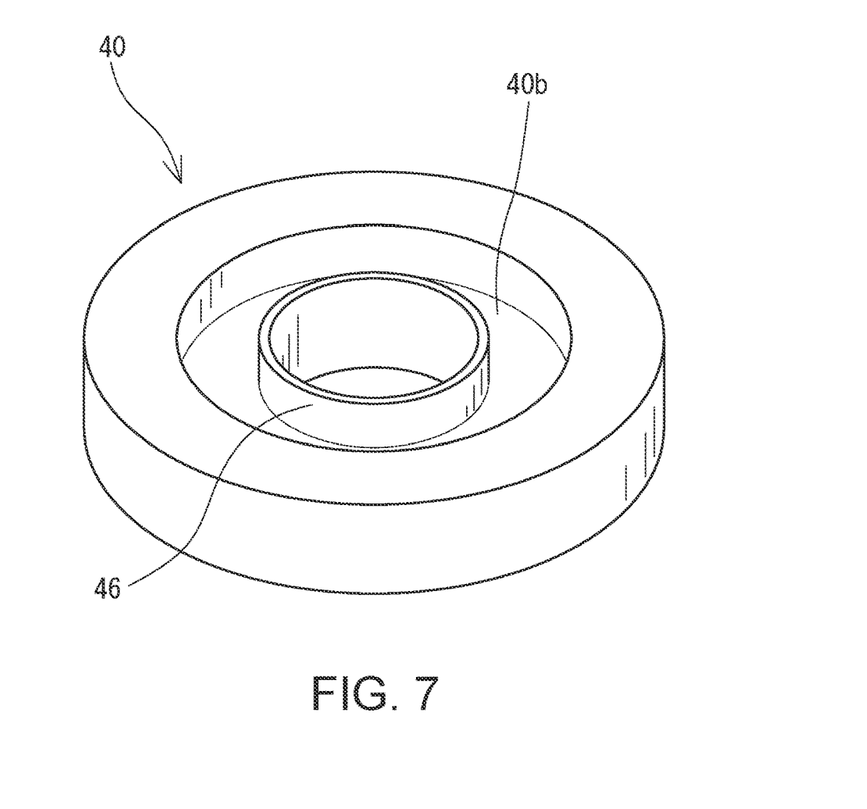
FIG. 7 is a perspective view of an end plate in FIG. 6.

In the above examples, the annular wall 46 is part of a member (the joining ring 44) that is separate from the end plate 40. In some embodiments, the annular wall 46 that extends axially to surround the outer circumference of the rotating shaft 16 is integral with the end plate 40. For example, as illustrated in FIGS. 6 and 7, the end plate 40 may include, at its axially outward end face, an annular channel 40b that is concentric with the rotating shaft 16 such that a thin annular wall 46 is formed between the annular channel 40b and the inner circumferential face of end plate 40. This configuration allows the annular wall 46 that is thin and is likely to elastically deform to extend axially from the axially outward end face of the end plate 40. With this configuration, the annular wall 46 has a substantially uniform thickness. The axial front end of this annular wall 46 is welded to the entire circumference of the outer surface of the rotating shaft 16, to thereby couple the end plate 40 with the rotating shaft 16.

This configuration may also relieve the stress by elastic deformation of the thin annular wall 46 and may therefore reduce the leg length of the welded portion to thereby reduce the amount of heat input to the rotating shaft 16 during the manufacturing process. This further prevents bending of the rotating shaft 16 caused by the heat, thereby simplifying the manufacturing process of the canned motor 10. Meanwhile, the end plate itself having a sufficiently large thickness efficiently prevents breakage or plastic deformation of the joining ring, and a portion of the end plate may be removed to regulate the rotation balance.

Figure 8:
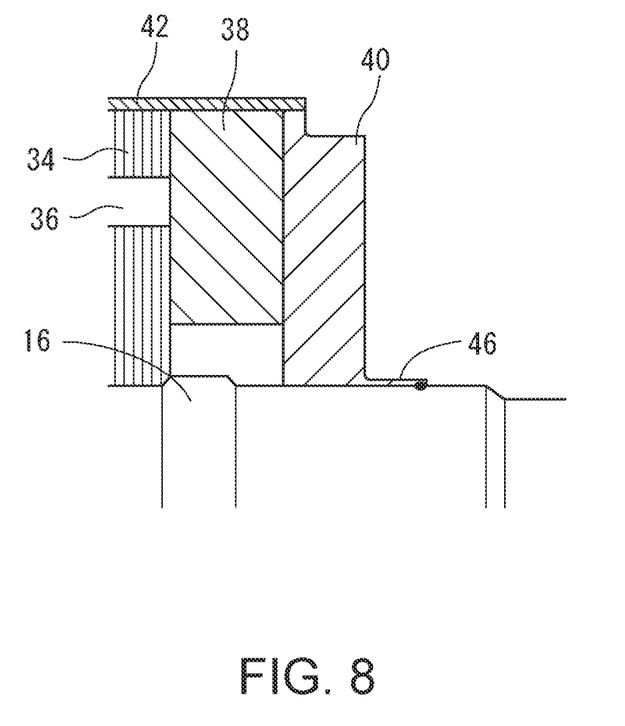
FIG. 8 is a diagram illustrating another example annular ring.

In another embodiment, the axially outward end face of the end plate 40 may be substantially flat, as illustrated in FIG. 8. This flat end plate 40 may include a thin annular channel 46b extending axially outward from a flat inner circumferential edge of the end plate 40. This configuration may also relieve the stress by elastic deformation of the thin annular wall 46, to thereby allow reduction in the leg length of the welded portion and simplification of the manufacturing process of the canned motor 10. Further, the whole end plate having a sufficiently large thickness efficiently prevents breakage or plastic deformation of the joining ring and allows a portion of the end plate to be removed for regulation of the rotation balance.

An end plate 40 is disposed at each of the opposite ends of the canned motor 10, that is, an end proximate to a load (toward right on the sheet in FIG. 1) and an end proximate to the front of the canned motor 10 (toward left on the sheet in FIG. 1). The annular wall 46 disclosed in the specification may be disposed on either one or both of these ends. Therefore, only the end plate 40 proximate to the front need be joined to the rotating shaft 16 via the annular wall 46, while the end plate 40 proximate to the load may be directly joined to the rotating shaft 16 without the annular wall, for example. Further, while in the above examples, the canned motor is incorporated into the pump, the technique disclosed in the specification is applicable to any type of canned motor that is incorporated into another device, such as an agitator.

REFERENCE SIGNS LIST 10 canned motor, 12 stator, 14 rotor, 16 rotating shaft, 18 motor housing, 20 stator core, 22 coil, 24 stator band, 26 stator can, 28, 29 end bell, 30 disk end plate, 32 bearing, 34 rotor core, 36 secondary conductor, 38 short-circuit ring, 40 end plate, 40a recess portion, 40b annular channel, 42 rotor can, 44 joining ring, 46 annular wall, 48 base portion, 50 outer circumferential wall, 100 canned motor pump, 102 motor section, 110 pump section, 112 impeller, 114 casing, 116 pump chamber.

The invention claimed is:

1. A canned motor, comprising:
   a rotor;
   a rotor can having a cylindrical shape, the rotor can housing the rotor;
   an end plate joined to the rotor can and covering an axial opening of the rotor can;
   a rotating shaft extending through the rotor and the end plate; and
   an annular wall surrounding an outer circumference of the rotating shaft, the annular wall being joined to or integral with the end plate, the annular wall having an axial front end joined to an entire circumference of the rotating shaft, wherein
   the end plate has a thickness that is greater than a thickness of the annular wall,
   the annular wall is separate from the end plate and is part of a joining ring partially joined to the end plate,
   the joining ring includes at least a base portion superposed on an axially outward end face of the end plate and the annular wall extending axially from an inner circumferential edge of the based portion,
   the joining ring has a substantially C-shape cross section including the base portion, the annular wall, and an outer circumferential wall extending axially outward from an outer circumferential edge of the base portion,
   the end plate includes, at the axially outward end face, a recess portion such that the end plate has a smaller thickness in a region corresponding to a width of the base portion from the inner circumferential edge of the end plate, and
   the joining ring is disposed in the recess portion and is joined to the end plate at the axial front end of the outer circumferential wall.

2. The canned motor according to claim 1, wherein
   the end plate has an annular channel that is concentric with the rotating shaft on an axially outward end face of the end plate, and
   the annular channel has an inner circumferential wall that functions as the annular wall.

3. A method for manufacturing the canned motor according to claim 1, comprising:
   disposing the annular wall along the outer circumference of the rotating shaft extending through a rotor core and the end plate; and
   welding the axial front end of the annular wall to the entire circumference of the rotating shaft.

4. The method according to claim 3, wherein
   a portion of the end plate is removed to regulate rotation balance of the rotor core.

\* \* \* \* \*